Figure 1:
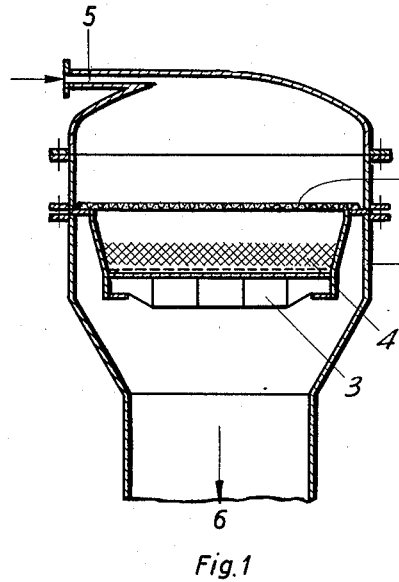

Jan. 12, 1960          H. RUDORFER          2,920,953
PROCESS AND APPARATUS FOR RECOVERING PLATINUM
AND PLATINUM-RHODIUM ALLOYS FROM
GASES CONTAINING SAME
Filed June 28, 1957

HERMANN RUDORFER
INVENTOR

By Wenderoth, Lind & Ponack
Attys

United States Patent Office 2,920,953
Patented Jan. 12, 1960

---

2,920,953

PROCESS AND APPARATUS FOR RECOVERING PLATINUM AND PLATINUM-RHODIUM ALLOYS FROM GASES CONTAINING SAME

Hermann Rudorfer, Linz, Austria, assignor to Oesterreichische Stickstoffwerke Aktiengesellschaft, Linz, Austria, a body corporate of Austria Application June 28, 1957, Serial No. 668,717

Claims priority, application Austria July 5, 1956

22 Claims. (Cl. 75—101)

This invention relates to a process of recovering noble metals, particularly of platinum metals, which are lost, e.g., by evaporation or mechanical separation during exothermic chemical reactions performed on catalysts consisting of such metals or alloys thereof.

In order to recover the largest possible amount of the catalytic noble metal which is evaporated or which is lost in the form of dust it has been proposed to use very expensive collecting substances and collecting devices and to arrange the same at various points of the reaction apparatus. In some cases the recovered amounts of platinum, rhodium or other alloying constituents of such noble metal catalysts were unsatisfactory and in other cases the manipulation and processing required for separating and isolating said metals were complicated and the collecting substances used were expensive themselves and in danger of being lost.

After time-consuming experiments aiming at an optimum recovery of platinum metals with the aid of least expensive auxiliary substances which can be processed most easily a method has been developed which constitutes the subject matter of the invention and will be described hereinafter.

The basic idea of the invention, which can be varied in adaptation to specific conditions, as will be shown hereinafter, resides on the one hand in the fact that an inexpensive and easily processable collecting material is used which consists of a representative of one of certain groups of substances, either alone or in a mixture with other representatives of the same group, said substances being stable and solid, such as oxides, at the operating temperatures at which the catalyst is used, or adapted to form such stable and solid substances at said operating temperatures.

Substances which are suitable for use according to the invention comprise oxides, hydroxides, carbonates, nitrates, acetates, ferrites, if desired also aluminates, zincates and phosphates of calcium, magnesium, barium strontium or of heavy metals which give soluble oxides, such as iron or copper.

When the collecting power of the collecting materials which consist of or originate from such compounds has been exhausted the collecting materials are separated from their noble metal content by being dissolved in appropriate solvents, in which the noble metals are insoluble.

Substances which are preferable because they are relatively inexpensive include calcium carbonate, e.g., in the form of natural marble, as well as dolomite and magnesite. After the catalyst furnace has been heated up these minerals are burnt to form CaO, MgO or mixtures thereof unless they have already been charged in the form of said oxides. Marble or the like can easily be crushed to the desired particle size.

In all cases care should be taken to ensure that only a minimum content of fluxes is present. This measure will lead to a product of heating having a natural porosity, which is of advantage for the collecting effect. It is also important that the content of $SiO_2$ should be low and should not exceed 0.2%, if possible, because otherwise the insoluble residue of platinum and its alloying constituents obtained after the noble metal laden mass has been dissolved will be contaminated with silicic acid in such a degree that the further processing is difficult.

If the combustion furnace is about 3 meters in diameter and is charged with about 3–3.5 metric tons of nitrogen per hour per combustion unit, consisting of 4 equal 3 m.-furnaces and operated at a temperature of about 800–900° C. the marble will have a particle size of about 3–5 mm. and will be used in a layer having a height of about 165 mm. The marble layer rests on a wire net of heat-resisting material, such as V2A, ohmanite, NCT-3 or the like alloy steel, which is supported on a thick perforated plate or another suitable support at the bottom of an apron provided below the catalyst bed.

It is obvious that by increasing the area available for the passage of gas, e.g. by providing the collecting layer in the shape of waves or tubes, the resistance to the flow of gas may be reduced, when required, or, where the resistance remains the same, the particle size of the collecting material may be reduced down to a certain minimum.

In special cases it may be of advantage to replace the granular mineral raw material such as crushed marble or the like by heat-resisting insoluble solids of the desired uniform size, which have been coated in the desired thickness with a layer of the compounds or oxides described for use as a collecting material. In this case the particle size which has proved an optimum for the passage of gas will be permanently provided and when the material is removed from the furnace or the like and is then processed it is sufficient to dissolve only the coating rather than the bodies consisting entirely of oxide. This reduces also the consumption of solvent acid or the like.

The collecting material thus described is capable of taking up the platinum metals which are separated in any form from the catalyst. Its collecting capacity is much higher than corresponds to the life of the catalyst itself.

The processing of the collecting material is very simple. Marble or the like is processed by an addition of dilute mineral acids, e.g. of dilute nitric acid, to the calcium oxide material slaked with water. The amount of acid added should be such that the pH-value does not fall below 6–7 in order to avoid a dissolution of any of the platinum metals. The residue amounting to 10–20% of the weight of the collecting material removed is processed in the usual manner to give pure metal.

Whereas these substances alone have a very high collecting activity this activity can be considerably increased by covering the layer or bed of such substances with a gas-permeable covering member of material which is stable at red heat. The gas premeability of said covering member should be at least equal to or higher than that of the underlying granulated material or layer of collecting bodies. This covering member may consist of a metallic sheet formed with holes or slots of or a grid or wire net of nonscaling material which is stable at red heat, such as V2A, V4A or ohmanite alloy steels, or of noble metals such as platinum, or its alloys, e.g. in the form of spent catalyst nets.

When used as supports for the bed these preferred covering nets of nonscaling base metal alloys consist of wire which is about 1 mm. thick whereas a thickness of 0.5 mm. is sufficient for the wire of the covering net, which is not mechanically stressed. Regarding the mesh size of the covering net it is desirable to avoid an unnecessary increase in the resistance offered by the catalytic platinum nets to the flow of gas so that the mesh size of the covering net on the collecting layer may be much larger than that of the platinum layer without adversely affecting the activity of the collecting layer. The surprising increase in activity achieved according to the invention will also be obtained if the mesh size of the covering net is equal to or somewhat larger than the particle size of the underlying collecting material. For this reason, mesh sizes of about 2–5 mm. will generally be sufficient. It is obvious that in the support for the bed according to the invention the total area of the openings should not be less than in the covering net. For this reason the support consists suitably also of a wire net or slotted plate of appropriate size.

Whereas the non-covered bed described first hereinbefore has enabled a recovery of the volatized platinum metals up to between one third and one half, the provision of the wire net covering according to the invention on the collecting bed enables a recovery of 86–88% including the collection of the smaller amounts of platinum metal which are mechanically separated during the removal due to the strong pitting of the platinum nets particularly when they have been used for a prolonged time. An explanation of the surprising increase in activity achieved by the use of the covering net with the afore-described collecting material cannot be given at this time.

Another technical advantage can be achieved in this connection if the bed of the collecting material is subdivided into several layers, which are separated from each other by intervening wire nets of the kind described hereinbefore. The first layer consisting of crushed marble and having a height of 60 mm. is placed on the lowermost net, which consists of wire having a thickness of about 1 mm. and has a mesh size up to about 5 mm., preferably of 2 mm. to 3 mm. This net rests on a perforated plate or another suitable support. Said first layer is covered by a net of wire having a smaller thickness, of about 0.5 mm. This net carries the next layer having a height of about 55 mm., followed by another, similar net and then by the third layer, which is about 50 mm. high, and finally by the last net having a mesh size of 2 mm. and consisting of wire having a thickness of about 0.3–0.5 mm. It has been found that the collected platinum metals are collected in layers having approximately the above thicknesses of 50:50:60 mm., considered from top to bottom, in proportions ranging from 64:26:10 to 70:22:8 so that during one heat of the furnace, which corresponds to the life of a set of catalyst nets, it is not necessary to remove the entire collecting device and to dissolve the entire charge, e.g. of CaO, in order to separate the platinum metals whenever a catalyst set is replaced. In view of the high capacity which such collecting mass has proved to possess it is sufficient to lift the covering net and remove the uppermost layer from the next lower net, e.g., by suction, whenever a platinum net is replaced. This uppermost layer is then processed further whereas the next lower layer must be removed and replaced by a layer of fresh collecting material only after a repeated replacement of the uppermost collecting layer. The replacement of any third layer which may be provided is necessary only in still longer intervals. This practice eliminates unnecessary costs for the processing of collecting layers containing only small amounts of platinum metals, and the replacement time may be further reduced.

It is thus seen that the covering of the collecting bed described first will increase the effectiveness and promote the collecting activity of the underlying collecting material. This effect is so strong that it becomes distinctly apparent if the collecting compounds described first hereinbefore, which consist of oxides or of compounds which are burnt to form oxides during operation, are replaced by heat-resisting and acid-insoluble bodies, the collecting effect of which, when used alone, was previously known to be utterly insufficient. These bodies may consist of baffle bodies of ceramics, vitreous silica or other artificial substances or of natural mineral substances having the same properties.

In this special case, however, an optimum collecting effect can be achieved if the catalytic platinum rhodium net is supported on a bed of the same material as the collecting bed. In this case it is also preferable not to dispose the collecting layer covered with the nonscaling wire net or the like in close proximity of the hot platinum catalyst but to dispose it at some distance from the catalyst in a region of reduced temperature, about 600–750° C., preferably at 680° C. In this case any pipe coils arranged between the catalyst and the collecting layer in order to produce steam will not have an adverse effect. It is of special advantage if the velocity of the gas is not higher in the collecting layer than in the catalyst net.

The baffle bodies may be of any shape and size known for this purpose and may consist, e.g., of 8 x 8 mm. or 5 x 5 mm. Raschig rings or of saddle-shaped bodies or other particulate materials.

Whereas when used alone such a collecting net, which is entirely untreated, has an unsatisfactory collecting activity, the covering consisting, e.g., of a wire grid or wire net of the type described proves to be an excellent promoter of this activity and is capable of increasing the recovery achieved with such bed from about one-third of the lost platinum—this is the value achieved without a covering net—to and above 85%.

In this connection it is interesting to note that the covering net described does not take part in any appreciable degree in the collecting action so that each covering net may be used many times for this purpose and will contain only just detectable traces of noble metals when it has finally become useless due to scaling.

In the collecting device just described the collecting material and possibly even the covering member can still be left in the reaction apparatus through additional platinum net periods (furnace heats) even if a thin platinum coating has been formed on the collecting material, whether the latter consists of ceramics or other material, because in the present case the collecting activity of the collecting bodies does not depend on the nature of their surface but on the combination, provided according to the invention, of such bodies with the covering net or the like of heat-resisting, nonscaling material.

The removal of the platinum metal covering from the removed baffle bodies is effected with aqua regia or, if desired, with chlorine water with an addition of air. These fluids may be kept in circulation. This treatment will result in the formation of concentrated solutions. If some platinum has deposited on the bed of carrying bodies which carry the catalytic noble metal net that bed is processed together with the just removed layer of the collecting material to recover platinum.

The process according to the invention may also be performed in a collecting device which is separate from the catalytic reaction apparatus because the hottest reaction zone should be avoided in any case to achieve an optimum collecting effect, as has been described hereinbefore.

A further simplification is also possible in this case by dividing the bed of baffle bodies forming the collecting layer by intervening wire nets of the type described hereinbefore into two or more layers. In that case it is sufficient to lift the covering net and to remove only the uppermost collecting layer and replace it by a layer of fresh material during or after some successive replacements of the catalytic platinum rhodium net. Thereby unnecessary processing costs for the mass of layers which have been impregnated only in a small degree can be eliminated until these layers have also collected a sufficient amount of platinum.

Where collecting materials of the type described first hereinbefore, consisting of oxides or of oxide-forming compounds, are used, an effect which is similar to that of the afore-described covering member consisting, e.g., of a nonscaling wire net or the like which is stable at red heat and used as a promoter for beds of baffle bodies which have at most only a low collecting activity when used alone, can be achieved if the said metal grids or wire nets or slotted or perforated plates mentioned by way of example are replaced as covering members for said oxide materials or the like by such acid-insoluble, heat-resisting bodies, e.g., of ceramics, quartz, vitreous silica or the like and their naturally occurring equivalents as have been described hereinbefore in connection with metallic covering members as collecting materials for separated platinum or as supporting bodies for the platinum catalyst. Such a combination of the individual materials provided according to the invention may comprise a bed having a height of about 60 mm., preferably more, up to about 160 mm., and consisting of the described oxides or of compounds of the type described hereinbefore which are converted into oxides during their previous burning or at the operating temperature of the catalyst, of about 800–900° C., and a covering layer of smaller thickness, which consists of bodies or particles of acid-insoluble refractory substances of the type mentioned in the second place. In this connection it may also be stated that almost the entire collecting activity resides in the oxides and the covering layer of ceramics or the like does hardly participate in the collection at all. Different from that variant of the process according to the invention which has been described in the second place the manner in which the platinum catalyst itself is supported is not important in this case.

When the active collecting layer covered in the manner described last is processed by being dissolved in mineral acid, preferably in dilute nitric acid up to a pH-value of at least 6–7 it does not matter whether the covering layer of ceramic bodies is first removed and the active collecting layer is processed alone or the covering bodies lying in a relatively thin layer on the collecting material are also subjected to an acid treatment together with the collecting material. In the second case it is sufficient to remove the valuable adhering solution from the Raschig rings or the like after the dissolving step has been completed, whereafter they can be used again. This may be repeated practically indefinitely.

It is thus apparent that in all these variants of the process according to the invention for the recovery of platinum metals which have been removed at high temperatures from platinum alloy catalysts by evaporation, blowing off or abrasion, a bed of baffle bodies which in itself is insufficiently active or has no appreciable activity at all in collecting platinum metals can be given such an activity up to a theoretical maximum by providing this bed with a metallic covering member which is gas-permeable, stable at red heat and has considerable non-scaling properties or with a natural or artificial mineral covering layer which is gas-permeable, refractory and acid-insoluble. It has been shown that such a metallic covering member, e.g. a wire net of V2A, V4A, NCT–3 or ohmanite alloy steel can be replaced by a covering layer of ceramics or the like in conjunction with an oxidic collecting layer and it has also been set forth that a very high collecting activity can be achieved by the use of oxides or oxide-forming compounds as a layer of baffle bodies.

According to the invention an optimum recovery of the smaller amounts of noble metal lost from catalysts by mechanical separation and the larger amounts of noble metal lost from such catalysts by evaporation is possible without requiring expensive or evaporable noble metals as collecting bodies and the collecting bodies used in this process, having an increased activity, can be processed in a much simpler and more economical manner than the previously employed noble-metal coated ceramic bodies or metal fabrics. Moreover, the activity of the collecting material according to the invention is just as independent of the gas pressure employed in the specific catalytic synthesis process as is the effect of the covering net described.

The fact that the active collecting oxide layer must not be considered a merely physically acting filter is apparent from the observation that, e.g., a marble lime which is otherwise burnt to a white color has a green color after use as a platinum collector and that the major portion of the platinum content of the platinum metal laden oxide will pass into solution when said oxide is treated with hydrochloric acid, which is never the case with platinum alone.

The accompanying drawing gives a diagrammatic showing of the arrangement of the platinum catalyst and of the platinum collecting bed according to various embodiments of the invention in the usual apparatus for the combustion of ammonia mixed with air with the aid of platinum as a catalyst.

Fig. 1 shows in a usual reaction or combustion apparatus 1 the arrangement of the platinum wire net catalyst 2, a supporting frame 3 for the platinum collecting bed 4 according to the first of the embodiments of the invention, consisting of a gas-permeable layer of heat resisting acid-soluble solids of active collecting oxides or compounds which form such oxides at the operating temperatures of the combustion furnace.

Those compounds rest on a perforated or slotted plate, which is known per se or on a grid or wire net, resting on the support device 3. Number 5 shows the gas-input and 6 the gas-output respectively.

Figure 2:
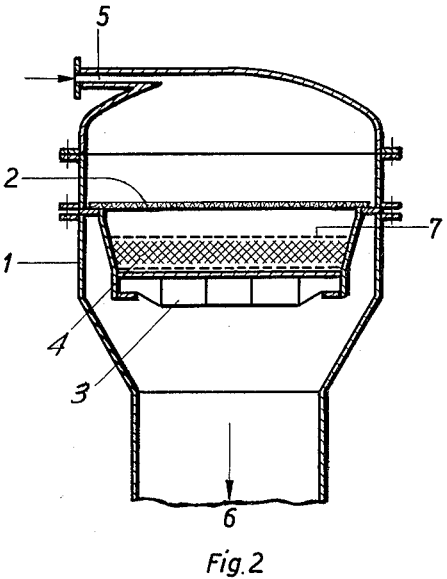

Fig. 2 shows the arrangement of the same collecting material, the activity of which is substantially increased in this case by a perforated or slotted plate or preferably by a grid or wire net 7 resting immediately on said layer 4 of oxides or the like.

Figure 3:
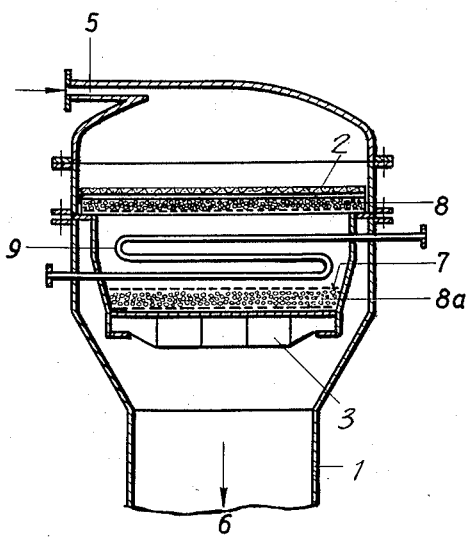

Fig. 3 shows that variant of the invention in which the catalytic platinum net 2 as well as the wire net 7 or the like which causes or promotes the collecting activity and consists of nonscaling metal rests on a layer 8 respectively 8a of ceramic or natural mineral bodies, which are acid-insoluble and have hardly any collecting activity by themselves and consist, e.g., of Raschig rings or the like.

Pipe coils or the like which are flown through by water and serve for withdrawing the heat of reaction behind the platinum catalyst are usually installed behind the collecting device according to the invention. In the variant according to Fig. 3, however, it may be advantageous to dispose such a device 9, which is used for the utilization of waste heat, between the catalyst and the collecting bed.

Figure 4:
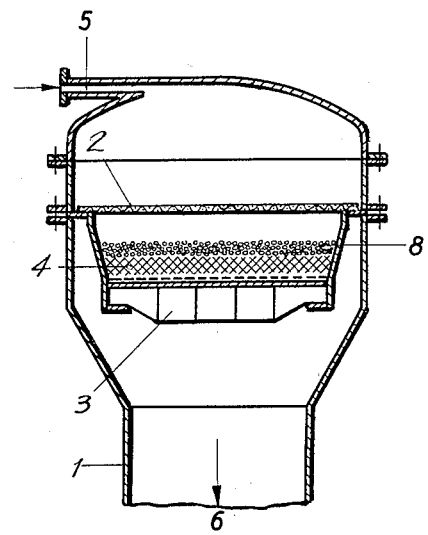

Fig. 4 shows another variation of the process according to the invention, in which a bed of the active collecting oxides 4 described is covered only by a thinner layer of acid-insoluble baffle bodies 8 of the type described hereinbefore. In this case it is not of substantial importance for the collecting activity of the oxide layer 4 whether the catalyzing platinum net 2 rests directly on a support of corrosion-resisting wire, in the usual manner, or on a low bed of acid-insoluble bodies, e.g. of ceramics, as is shown in Fig. 3. In the Figures 1 to 4 the same nomenclature is used for the same apparatus elements.

*Examples*

(1) In an ammonia combustion furnace 3 meters in diameter and containing three platinum rhodium nets resting on a layer of ceramic filling bodies, which layer has a height of 250 mm., a heaped layer of granulated marble was incorporated in a height of 165 mm. between two nets of NCT–3 (mesh size 3 mm., diameter of wire 0.5 mm.) behind the platinum rhodium nets. The measured temperature of the uppermost platinum rhodium net was 830° C. (cooling by the incoming fresh gas) whereas the measured temperature in the marble layer was 920° C. 404 metric tons of nitrogen were burnt during the residence time of the marble in the furnace; the loss of platinum amounted to 136.5 grams.

The removed collecting bodies were processed by treating them with 45% nitric acid. The insoluble sludge which contained the noble metal was dissolved in hydrochloric acid and the platinum was precipitated as its sulfide out of the hydrochloric acid solution. The platinum rhodium concentrate obtained after the burning of the sulfide has a concentration of about 80% and can be purified by usual methods.

In this way a recovery of 120.2 g. noble metal was possible, which corresponds to 88% of the loss of noble metal.

(2) In each of two ammonia combustion furnaces 3 metres in diameter and containing each three platinum rhodium nets supported on a layer consisting of porcelain filling bodies and having a height of 250 mm., a layer of granulated marble in a height of 60 mm. was heaped between two NCT-3 nets (mesh size 2 mm., wire diameter 0.5 mm.) behind the platinum rhodium nets. The loss of noble metal from the catalyst nets during the operating time of 3796 hours totalled 1504.8 grams. At the same time 5024 metric tons of nitrogen were burnt at a temperature of 840° C. measured at the uppermost net.

The processing of the removed collecting bodies enabled a recovery of 1022.5 grams of noble metal, corresponding to 68% of the loss of noble metal.

(3) Combustion gases having a noble metal content of 22.2 γ per cubic meter were taken at a rate of 92.85 cubic meters per hour (N.T.P.) from an ammonia combustion furnace 3 meters in diameter and containing three platinum rhodium nets lying on a layer of ceramic filling bodies (porcelain), which layer had a height of 250 mm. and a temperature of about 850° C. These combustion gases were passed through a container 300 mm. in diameter and filled with 6 liters of 8 x 8 mm. Raschig rings of porcelain at a measured temperature of 670° C. The Raschig rings were divided by intervening V2A nets (576 meshes per square centimeters, wire thickness 0.16 mm.) into three layers, the uppermost one of which was also covered by a V2A net. After a total of 133,700 cubic meters (N.T.P.) of gas had flown through, corresponding to a combustion of 10.14 metric tons of nitrogen, the amount of noble metal entrained in the gas amounted to 2.970 grams.

When the Raschig rings were removed they showed a thick noble metal covering. When they were processed the amount of recovered platinum rhodium was 2.851 grams, which corresponds to a recovery of 96.4%.

(4) In an experimental ammonium combustion furnace 300 mm. in diameter and containing three platinum rhodium combustion nets lying on a layer of 8 x 8 mm. Raschig rings, which layer had a height of about 70 mm. and a temperature of about 850° C., these rings were followed by a gas cooler, behind which 8 x 8 mm. Raschig rings were incorporated in three layers about 30 mm. high each and separated by V4A nets (576 meshes per square centimeter, wire thickness 0.16 mm.). A similar V4A net was placed on the uppermost of the three layers.

Another layer of Raschig rings in a height of about 30 mm. was arranged at some distance from the collecting layer according to the invention for control purposes.

After the experimental furnace had been started the gas cooling was adjusted so that the temperature in the three Raschig ring layers was maintained at 670° C. whereas the temperature in the supporting layer directly below the nets (70 mm. high, consisting of 8 x 8 mm. Raschig rings) was measured with thermocouples as about 850° C.

The furnace was charged with an ammonia-and-air mixture at a rate of 105 cubic meters (N.T.P.) and during the experiment a total of 3.05 metric tons of nitrogen were burnt.

When the noble metal coated Raschig rings were processed it was found that 0.728 gram of the 0.943 gram of noble metal lost from the combustion nets had been collected, which corresponds to a recovery of 77.2%.

(5) In an experimental ammonia combustion furnace 300 mm. in diameter and containing three platinum rhodium combustion nets resting on a net of NCT-3, a layer of granulated marble in a height of 85 mm. and covered by a layer of ceramic filling bodies in a height of 30 mm. was incorporated behind the combustion nets.

The temperature of the platinum rhodium nets was measured with a thermocouple as 830° C. The temperature of the collecting material below the covering layer, which collecting material is transformed into oxides while delivering carbon dioxide, was about the same as the temperature measured at the platinum catalyst.

The furnace being charged at a rate of 93 cubic meters (N.T.P.) per hour, a total of 14.63 metric tons of nitrogen was burnt during the experiment. The loss of platinum from the three nets was 5.536 grams.

After the experiment the burnt marble was removed and slaked with water; then 45% nitric acid was added until up to pH 7. The noble metal was dissolved with hydrochloric acid out of the noble-metal containing residual sludge and was precipitated as its sulfide out of the hydrochloric acid solution. The pure noble metal was recovered in known manner from the sulfide. Thus a recovery of 3.795 grams of noble metal was possible, which corresponds to a recovery of 68.5%.

Only traces of platinum, which were just detectable were found on the Raschig rings covering the marble layer.

What is claimed is:

1. A process which comprises passing a gas containing a metal selected from the group consisting of platinum and a platinum-rhodium alloy at a temperature from about 800° to about 900° C. through a gas-permeable layer of solids, at least the surface of which consists essentially of a substantially silicate-free acid-soluble material selected from the group consisting of oxides, hydroxides, carbonates, nitrates, acetates, ferrites, aluminates, zincates and phosphates of calcium, magnesium, barium, strontium, and of heavy metals adapted to form soluble oxides.

2. A process as set forth in claim 1, in which said acid-soluble material consists of oxides.

3. A process as set forth in claim 1, in which said acid-soluble material is substantially free of fluxes.

4. A process as set forth in claim 1, in which said acid-soluble material is a mineral having an $SiO_2$ content not substantially exceeding 0.2%.

5. A process for recovering platinum and platinum-rhodium alloys from gases containing same which comprises (1) passing said gases at a temperature from about 800° to about 900° C. through a gas-permeable layer of solids, at least the surface of which is substantially silicate-free and consists essentially of an acid-soluble granular calcium compound which is converted at said temperature to stable oxides, and (2) dissolving said oxides in an acid solvent in which the platinum and platinum-rhodium alloys are substantially insoluble.

6. A process for recovering platinum and platinum-rhodium alloys from gases containing same which comprises (1) passing said gases at a temperature from about 600° to 900° C. through a gas-permeable layer of solids, at least the surface of which is calcium oxide, and (2) dissolving said oxide in an acid solvent in which the platinum and platinum-rhodium alloys are substantially insoluble.

7. A process for recovering platinum and platinum-rhodium alloys from gases containing same which comprises (1) passing said gases at a temperature from about 800° C. to about 900° C. through a gas-permeable layer of solids, at least the surface of which is substantially silicate-free and consists essentially of an acid-soluble granular magnesium compound which is converted at said temperature to stable oxides, and (2) dissolving said oxides in an acid solvent in which the platinum and platinum-rhodium alloys are substantially insoluble.

8. A process for recovering platinum and platinum-rhodium alloys from gases containing same which comprises (1) passing said gases at a temperature from about 600° to 900° C. through a gas-permeable layer of solids, at least the surface of which is magnesium oxide, and (2) dissolving said oxide in an acid solvent in which the platinum and platinum-rhodium alloys are substantially insoluble.

9. A process which comprises passing a gas containing a metal selected from the group consisting of platinum and a platinum-rhodium alloy at a temperature from about 800° to about 900° C. through a gas-permeable layer of solids, having a core and a surface, the surface of which consists essentially of a substantially silicate-free acid-soluble material selected from the group consisting of oxides, hydroxides, carbonates, nitrates, acetates, ferrites, aluminates, zincates and phosphates of calcium, magnesium, barium, strontium, and of heavy metals adapted to form soluble oxides, and the core of which is acid-insoluble.

10. A process of recovering noble metals selected from the group consisting of platinum and platinum-rhodium alloys from gases containing same which comprises passing said gases through a gas-permeable layer of heat-resisting solids initially consisting at least at their surface of a substantially silicate-free acid-soluble calcium compound, said gases when being passed through said layer being at a sufficiently elevated temperature to enable said noble metals to be collected from said gases by said acid-soluble compound, and said compound at said elevated temperature being in the form of a stable calcium oxide, and then dissolving said compound in an acid solvent in which said noble metals are substantially insoluble.

11. A process as set forth in claim 10 in which said acid-soluble compound is in its naturally occurring form.

12. A process of recovering noble metals selected from the group consisting of platinum and platinum-rhodium alloys from gases containing same which comprises passing said gases through a gas-permeable layer of heat-resisting solids initially consisting at least at their surface of a substantially silicate-free acid-soluble magnesium compound, said gases when being passed through said layer being at a sufficiently elevated temperature to enable said noble metals to be collected from said gases by said acid-soluble compound, and said compound at said elevated temperature being in the form of a stable magnesium oxide, and then dissolving said compound in an acid solvent in which said noble metals are substantially insoluble.

13. A process according to claim 11 in which said acid-soluble compound is in its naturally occurring form.

14. A process of recovering noble metals selected from the group consisting of platinum and platinum-rhodium alloys from gases which comprises passing said gases through a gas-permeable layer of substantially silicate-free granular calcium carbonate, said gases when being passed through said layer being at a sufficiently elevated temperature to enable said noble metals to be collected from said gases by said layer, and then dissolving said layer in an acid solvent in which said noble metals are substantially insoluble.

15. A process of recovering noble metals selected from the group consisting of platinum and platinum-rhodium alloys from gases which comprises passing said gases through a gas-permeable layer of substantially silicate-free granular magnesium carbonate, said gases when being passed through said layer being at a sufficiently elevated temperature to enable said noble metals to be collected from said gases by said layer, and then dissolving said layer in an acid solvent in which said noble metals are substantially insoluble.

16. A process of recovering noble metals selected from the group consisting of platinum and platinum-rhodium alloys from gases which comprises passing said gases through a gas-permeable layer of substantially silicate-free crushed marble, said gases when being passed through said layer being at a sufficiently elevated temperature to enable said noble metals to be collected from said gases by said layer, and then dissolving said layer in an acid solvent in which said noble metals are substantially insoluble.

17. A process of recovering noble metals selected from the group consisting of platinum and platinum-rhodium alloys from gases which comprises passing said gases through a gas-permeable layer of substantially silicate-free crushed magnesite, said gases when being passed through said layer being at a sufficiently elevated temperature to enable said noble metals to be collected from said gases by said layer, and then dissolving said layer in an acid solvent in which said noble metals are substantially insoluble.

18. A process of recovering noble metals selected from the group consisting of platinum and platinum-rhodium alloys from gases which comprises passing said gases through a gas-permeable layer of substantially silicate-free crushed dolomite, said gases when being passed through said layer being at a sufficiently elevated temperature to enable said noble metals to be collected from said gases by said layer, and then dissolving said layer in an acid solvent in which said noble metals are substantially insoluble.

19. A process of recovering noble metals selected from the group consisting of platinum and platinum-rhodium alloys from gases which comprises passing said gases through a gas-permeable layer which consists essentially of a mixture of at least two substantially silicate-free acid-soluble materials selected from the group consisting of oxides, hydroxides, carbonates, nitrates, acetates, ferrites, aluminates, zincates and phosphates of calcium, magnesium, barium, strontium, and of heavy metals adapted to form soluble oxides, said gases when being passed through said layer being at a sufficiently elevated temperature to enable said noble metals to be collected from said gases by said layer, and then dissolving said layer in an acid solvent in which said noble metals are substantially insoluble.

20. A process of recovering noble metals selected from the group consisting of platinum and platinum-rhodium alloys from gases containing same which comprises passing said gases in succession through two different layers selected from the group consisting of (a) an apertured member of metallic material which is stable at red heat and rests on the next following layer;

(b) a gas-permeable layer of acid-insoluble refractory solids;

(c) a gas-permeable layer of heat-resisting solids initially consisting at least at their surface of an acid-soluble substantially silicate-free material selected from the group consisting of the oxides, hydroxides, carbonates, nitrates, acetates, ferrites, aluminates, zincates, and phosphates of calcium, magnesium, barium, strontium, and of heavy metals adapted to form soluble oxides, said gases when being passed through the second of said layers being at a sufficiently elevated temperature to enable said noble metals to be collected from said gases on the surface of said solids of said second layer, and then contacting the solids of said second layer with a solvent having a substantially different dissolving power on the substance forming the surface of the solids of said second layer and said noble metals collected thereon.

21. In an apparatus through which gas may be flown, the improvement wherein two different successive layers through which said gas must pass are selected from the group consisting of:

(a) an apertured member of metallic material which is stable at red heat and rests on the next following layer;

(b) a gas-permeable layer of acid-insoluble refractory solids;

(c) a gas-permeable layer of heat-resisting solids initially consisting at least at their surface of an acid-soluble substantially silicate-free calcium oxide.

22. In an apparatus through which gas may be flown, the improvement wherein layers through which said gas must pass successively are selected from at least two different members of the group consisting of:

(a) an apertured member of metallic material which is stable at red heat and rests on the next following layer;

(b) a gas-permeable layer of acid-insoluble refractory solids;

(c) a gas-permeable layer of heat-resisting solids initially consisting at least at their surface of an acid-soluble substantially silicate-free magnesium oxide.

References Cited in the file of this patent

UNITED STATES PATENTS

| | | |
|---|---|---|
| 2,302,725 | Uschmann | Nov. 24, 1942 |
| 2,786,752 | Appell | Mar. 26, 1957 |